July 11, 1944.  H. L. CHISHOLM, JR  2,353,610
OIL COOLER CONTROLLING STRUCTURE
Filed Aug. 1, 1942  3 Sheets-Sheet 3
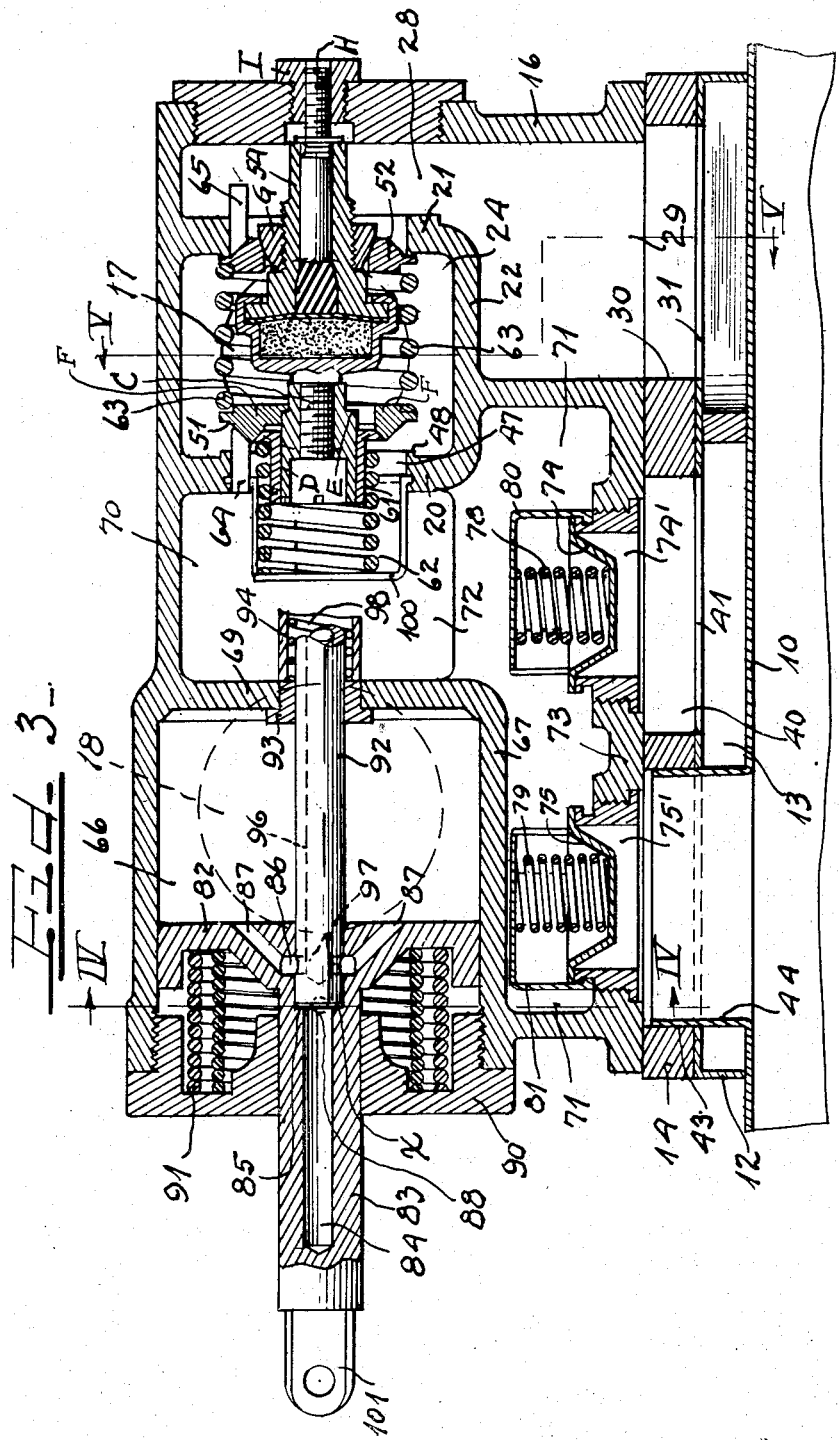
Inventor
Harry L. Chisholm Jr.
by
Attys.

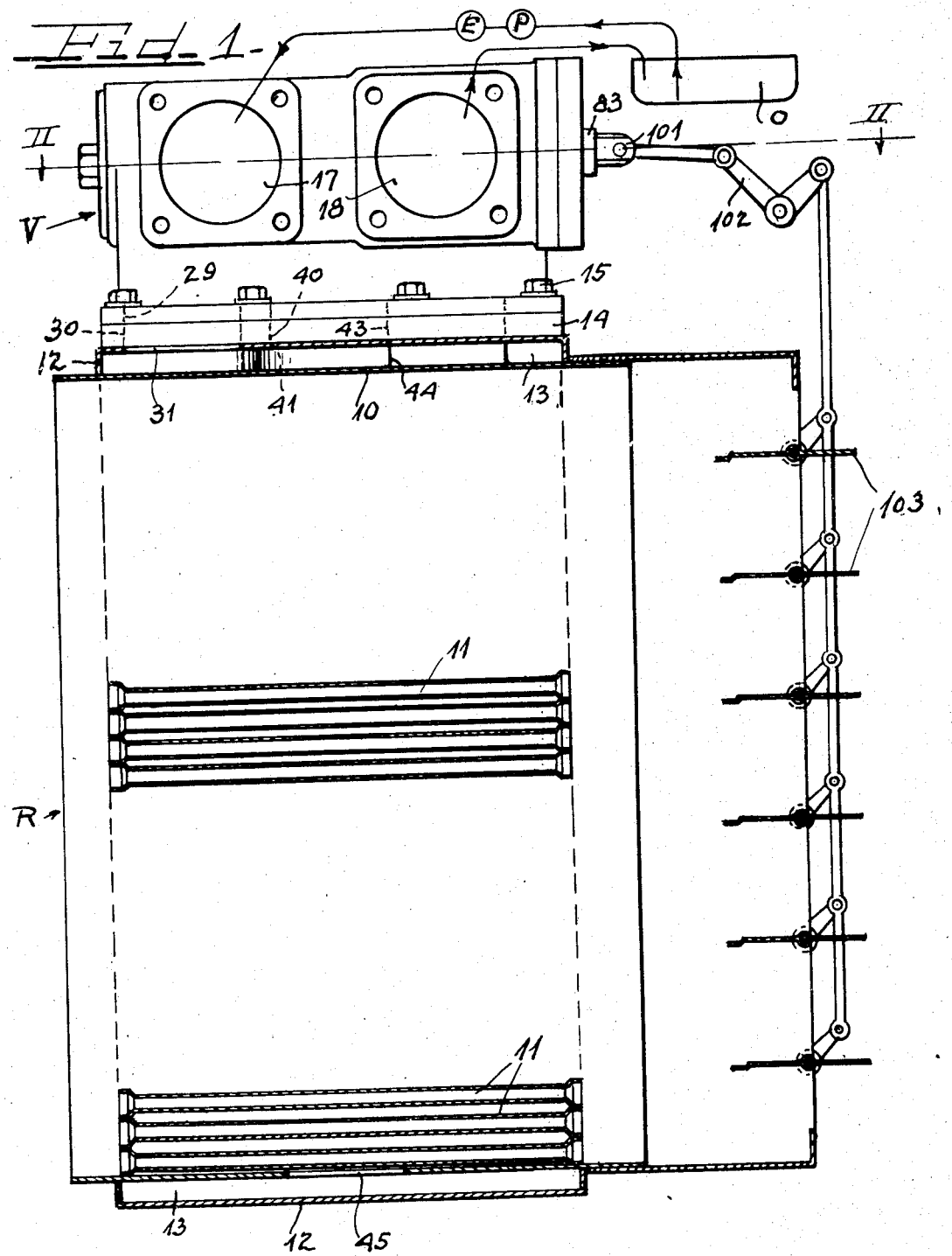

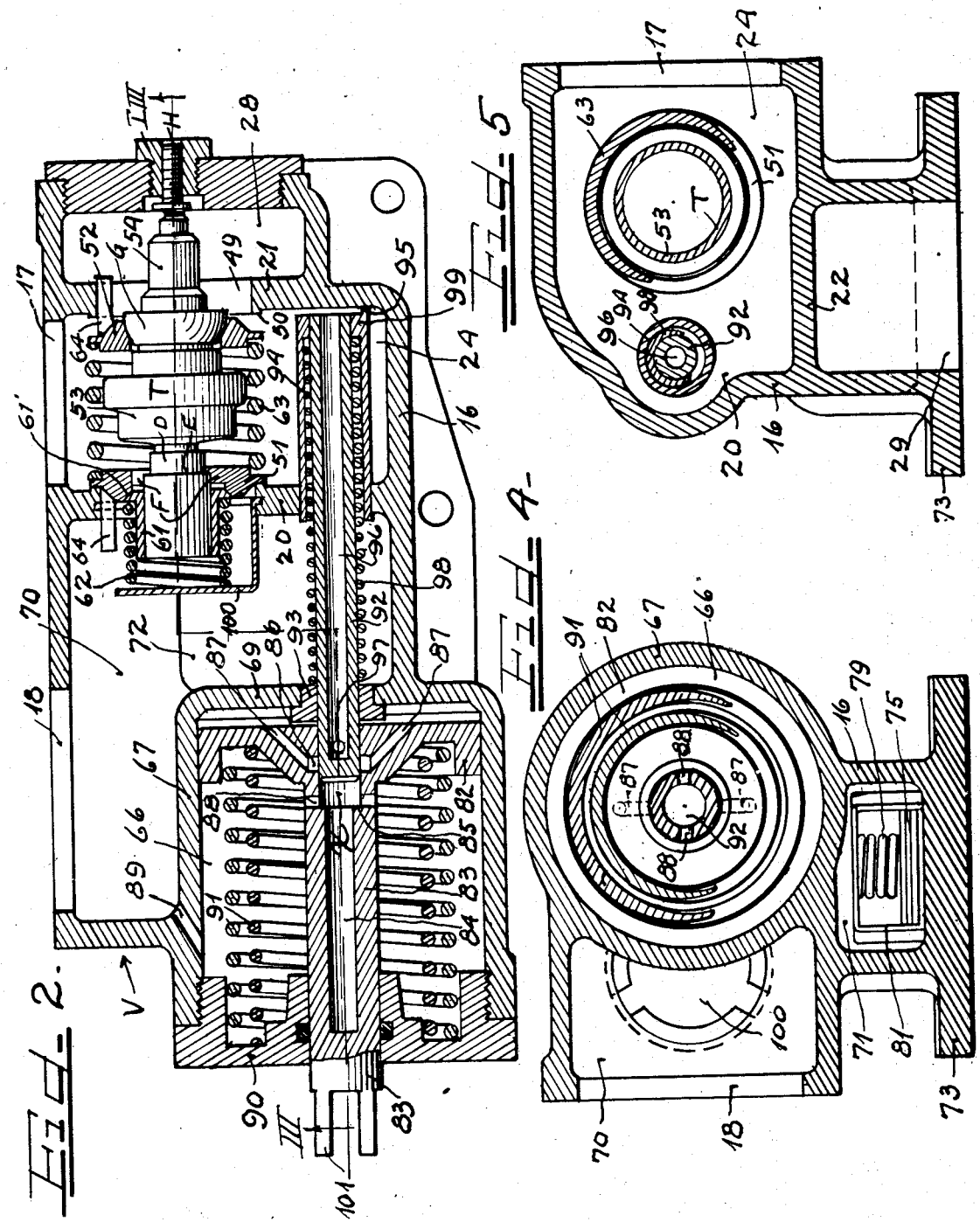

Patented July 11, 1944

2,353,610

UNITED STATES PATENT OFFICE 2,353,610

OIL COOLER CONTROLLING STRUCTURE

Harry L. Chisholm, Jr., Buffalo, N. Y.

Application August 1, 1942, Serial No. 453,299

8 Claims. (Cl. 236—34)

My invention relates to a controlling structure for oil coolers, particularly oil coolers used in connection with hydrocarbon engines, such as aircraft engines, for keeping the lubricating oil in the most desirable condition for efficient lubrication.

The invention relates particularly to improved valving assembly for controlling the oil flow through the cooler warming jacket and radiator, and for controlling the operation of shutters provided on the cooler.

An important object of the invention is to provide a valving assembly in which valves in the path of the oil from the engine are thermostatically set in accordance with temperature to control the flow of the engine oil directly to a sump or reservoir or to the cooler, and in which spring resisted valves are interposed in the warming jacket outlet and the radiator circuit outlet to be controlled by the fluid pressure to apportion the flow through the jacket and the radiator circuit.

A further object of the invention is to provide for setting of the cooler shutters in accordance with the pressure of the engine oil in the inlet end of the valving assembly.

Another object is to provide in the valving assembly a cylinder with a piston therein connected with the cooler shutters, with the movement of the piston controlled by the pressure of the engine oil within the inlet end of the valving assembly.

Still another object is to provide valve means controlled by the pressure of the engine oil in the inlet end of the valve assembly for in turn controlling the flow of this oil into the cylinder for operation of the piston therein.

Another object is to provide a valving assembly in which the valve chamber receives the oil from the engine and has therein valves thermostatically set to control the flow to the cooler, and valve means controlled by the pressure in said valve chamber to in turn control the flow of oil from said valve chamber to the cylinder for operation of the piston to move the shutters in closing direction, and with spring means for moving the piston in direction for opening of the shutters.

The above enumerated and other features of my invention are incorporated on the accompanying drawings, of which:

Figure 1 is a side elevation, partly in section, of an oil cooler with the improved valving assembly mounted thereon;

Figure 2 is an enlarged section on plane II—II of Figure 1, showing the thermostatically controlled valves set for flow of engine oil to the cooler, and with the cylinder structure in position for shutter opening;

Figure 3 is a section on plane III—III of Figure 2 showing the thermostatically controlled valves set for closure against flow of the engine oil to the cooler and the piston in the cylinder shifted out by the pressure for closure of the cooler shutters;

Figure 4 is a section on plane IV—IV, of Figure 3; and

Figure 5 is a section on plane V—V of Figure 3.

Referring particularly to Figure 1, R indicates the radiator structure and V the valve structure. The radiator structure shown is of a conventional type, comprising the cylindrical shell 10 through which extend the tubes 11 soldered or otherwise secured together at their ends and exposed for the flow therethrough of air during running of the vehicle or airplane. Surrounding the shell 10 is the warming jacket 12 providing the annular warming space 13 around the shell and connected at its lower sides with the radiator through passage 45. Mounted on top of the warming jacket is a base or plate 14 on which the valve structure V seats and is secured as by screws 15.

Referring particularly to Figures 2, 3, 4, and 5, the valve structure V comprises the housing 16 having the inlet 17 for the oil from the engine, and the outlet 18 for the return flow from the radiator and warming jacket to the reservoir from which the oil to the engine is pumped. Within the housing to either side of the inlet 17 are the transverse walls 20 and 21 between the sides and top of the housing. The lower ends of the transverse walls are connected to the horizontal wall 22 extending between the sides of the housing. The walls 20, 21 and 22, together with the sides and top of the housing 16 define a valve chamber 24.

Partly surrounding the walls which define the valve chamber 24 is the inlet space 28, the outlet passageway 29 from which registers with the passage way 30 through the base 14 on the warming jacket, the jacket having the inlet 31 communicating with the passageway 30.

To the left of the valve chamber 24 is the cylindrical space 66 defined by the cylindrical portion 67 of the housing 16, and the inner transverse wall 69, the axis of the space 66 being to one side of but parallel with the axis of the valve chamber.

Communicating with the outlet 18 is the outlet chamber 70, defined by the side walls of housing 16 and the walls 67, 69 and 20 and communicating with the valve chamber 71 through the vertical passageway 72. The valve chamber 71 is defined by the sides and end wall of the housing 16, the cylindrical wall 67, the wall 20 and the housing bottom wall 73, in which valve chamber are located the jacket outlet valve 74 and the radiator outlet valve 75, the ports 74' and 75' of which register with corresponding ports 40 and 43 in the base or plate 14 on the warming jacket 12, the ports 40 and 43 registering respectively with the jacket outlet 41 and the radiator outlet 44. The valves 74 and 75 are respectively held against their seats 76 and 77 by the springs 78 and 79 which react against the guide cages 80 and 81.

Slidably operable within the cylindrical chamber 66 is the piston 82 which is rigidly secured to or integral with the piston rod 83 which has the bore 84 enlarged at its inner end to provide a valve chamber X and to leave a shoulder 85. Surrounding the inner end of the valve chamber is the annular port 86 which communicates by means of the passageways 87 with the inner end of the chamber 66 between the piston face and the wall 69. The outer end of the valve chamber X is connected by the ports 88 with the outer or low pressure end of chamber 66, this low pressure end being vented to the outlet space 70 through the passageway 89 adjacent to the cylinder head 90 through which the piston rod extends. Interposed between the cylinder head 90 and the piston 82 is the concentric spring assembly 91 which urges the piston inwardly toward the wall 69.

Slidable at its outer end in the valve chamber X is the hollow valve rod 92 extending slidably through the bearing 93 in the wall 69 through the chamber 70 and through the wall 20 into the valve chamber 24. Affixed to the outer end of the valve rod is the hollow plunger 94 which is guided through a bearing bore in the wall 20. On the outer end of the plunger 94 or on the inside of the housing 16 is a spacer stop such as 95 to assure a passageway for the flow of oil from the chamber 24 into the bore 96 of the valve rod 92. At the inner end of the bore 96 are the ports 97 which, as shown in Figure 2, are normally closed off from the annular port 86 and the passageways 87 in the piston 82. Interposed between the bearing 93 or the wall 69 and the inner end of the bore of the plunger 94 is the control spring 98 which balances the valve rod and plunger assembly against the pressure in the chamber (24) acting against the head 99 of the plunger assembly.

Referring to Figures 2, 3, 4, and 5, in the inlet passageway of the valve structure V, the wall 20 has the passageway therethrough to this outlet space 70 which passageway at its inner end is surrounded by the valve seat 48, and the wall 21 has the passageway 49 therethrough which at its inner end is surrounded by the valve seat 50. Within the valve chamber 24 there is the valving assembly comprising the annular valve 51 and the annular valve 52 for cooperating respectively with the valve seats 48 and 50. Between the valves is a thermostat T which may be of the type known in the trade as the "Vernet" type. This thermostat comprises the body or container 53 from which extends the neck 54 for the plunger 55 to be acted upon by the thermostatic material 56 within the container which, when expanded by rising temperature, will exert outward pressure against the plunger. The thermostat neck 54 extends axially through the valve 52 and has rigidly secured thereto the collar G against which the valve is held by the spring 63 which is interposed between the valves 51 and 52.

Formed on the inner end of the thermostat body 53 is a stud C to which is rigidly secured a sleeve D which at its inner end has a shoulder E. Slidably mounted on the sleeve D is the annular relief valve 61, the head of which is held against a mating surface 61' on the valve 51 by the spring 62 whose inner end seats against a retainer 100 anchored to the wall 20. Inwardly projecting from the annular valve 51 are the fingers F which react against the shoulder E on the sleeve D to form a stop for the valve 51 against the spring 63. This unitary assembly comprising the thermostat T, the three valves 51, 52 and 61, the spring 63, the collar G, and the sleeve D is shiftable axially, the axial movement being guided by the guide wings 64 and 65 on the valves 51 and 52, respectively, engaging with the walls 20 and 21. The thermostat is adjusted so that at temperatures below, say 100° F., the thermostat will be in its contracted position, and its body together with the valves will be shifted to the right (Figure 3) by the spring 62 for unseating the valve 51 and seating the valve 52. At the same time, the thermostat body receives the plunger 55 whose head engages the adjustable abutment screw H in the plug I in the adjacent end wall of housing 16. As the thermostat is subjected to higher temperatures, the material therein will expand, and as the spring 63 is stronger than the spring 62, the thermostat body with the valves thereon will be shifted away from the plunger 55 and toward the left for opening of the valve 52 and closing of the valve 51. As the temperature rises further, the valve 52 will eventually be fully opened, and the valve 51 will be fully closed (Figure 2). The thermostat may continue to expand after the valve 51 has been seated and, unless means were provided to allow such overtravel the thermostat body would burst. To permit overtravel without fracture, the sleeve D, which is attached to the thermostat, slides axially to the left within the relief valve 61. The shoulder E of the sleeve D moves away from the stop fingers F on the valve 51, and the collar G which is attached to the thermostat pulls the valve 52 further to the left to a position beyond its normal fully opened position.

On Figure 1 is diagrammatically shown a supply sump O for the lubricating fluid from which the pump P draws the oil for delivery to the engine E, the oil flowing from the engine through the inlet 17 of the valve structure V and returns to the reservoir through the outlet 18.

Describing now the operation, before the engine is started, the temperature in the valve structure V is such that the thermostat T is contracted, as shown on Figure 3, the valves 51 and 52 being respectively open and closed. The thermostat T is adjusted to remain contracted under, say 100° F., and as the engine now starts, the pump P driven thereby will draw oil from the sump O and force it through the engine bearings, the oil flowing from the engine into the inlet 17 around the valve assembly and past the open valve 51 through the passageway 47 into the outlet space 70 and from there through the outlet 18 back to the sump. This permits a rapid warming of the oil in the sump since it receives no cooling flow from the radiator. The warmed oil, engaging with the thermostatic element T, raises the temperature thereof above 100° F. to actuate the thermostat to open the valve 52 and move the valve 51 toward its closing position so that oil may then flow into the inlet space 28 and through the passageways 29 and 30 to the inlet 31 of the warming jacket, and through the warming jacket out of the jacket outlet 41 and through the passageway 40 into the valve port 74'. The oil in the radiator being usually sluggish when the engine is started, the resistance to the flow from the engine will cause pressure to build up against the valve 74 in the jacket outlet, and when this pressure has reached, say 30 lbs. per sq. inch, the valve will start to open against the spring 78 for flow from the jacket into the valve chamber 71 and through the vertical passageway 72 into the chamber 70 and through the outlet 18 back to the sump. During this time, some oil may be forced from the jacket through passage 45 into and through the radiator due to the 30 lb. per sq. inch pressure in the jacket circuit, and past the valve 75 against its spring 79 which is comparatively light, and this flow will enter the valve chamber 71 and join the flow from the jacket to the outlet 18. This slight flow through the radiator assists in the warming thereof, and as the radiator warms and the resistance to flow through it decreases, the rate of flow increases until a temperature, say 180° F. is reached, the pressure through the jacket dropping down below 30 lbs. per sq. inch so that the spring 78 closes the valve 74, all of the oil then flowing through the radiator, through the open valve port 75'.

Should the oil in the radiator suddenly become sluggish or congealed, pressure will again build up in the jacket and the valve 74 will be opened for flow through the jacket until the radiator has again become warmed up for normal flow therethrough. Should the oil in both the radiator and the warming jacket suddenly congeal while the valve 51 is held closed by the thermostat T (Fig. 2), the built up pressure will open the relief valve 61 for flow of the engine oil through the passageway 47 into the outlet space 70 and back to the sump until the pressure built up by the oil from the engine can re-establish flow through the jacket.

Describing now the shutter operation, the yoked end 101 of the piston rod 83 is attached through suitable linkage 102 to shutters 103 which control the rate of air flow through the radiator. Before the engine is started the shutters are fully open, the piston 82 being at the inner end of the cylinder chamber 66 as shown on Figure 2. If there is no pressure in the valve chamber 24, the spring 98 will hold the valve rod 92 and the plunger 94 thereon in outer position against the stop 95 (Fig. 2) and the outer end of the valve rod will be between the annular port 86 and the ports 88 to shut off the piston passageways 87 from the valve port 97 which will be closed by the piston. The spring assembly 91 holds the piston at its inner end, and the cooler shutters are held fully open as shown on Figure 1. When the engine is started, pressure is built up in the valve chamber 24 which pressure acts on the head 99 of the valve rod assembly and forces it outwardly against the predetermined load of the spring 98. This outward movement of the valve assembly brings its ports 97 into registration with the annular port 86 for flow of oil from the valve chamber 24 through the bore 96 of the valve assembly and through the valve ports into the annular port 86 and out through the passages 87 into the inner end of the cylinder space 66, and so long as the valve assembly moves outwardly for registration of its ports with the annular port 86, the oil will force the piston outwardly against the resistance of the springs 91, the oil in the outer end of the cylinder chamber 66 escaping through the passageway 89 into the outlet chamber 70. The valve rod assembly thus moves outwardly in accordance with the pressure in the valve chamber 24, and when such outward movement stops, the piston will continue its movement a short distance until it carries the annular port 86 away from the valve ports 97, and then the piston is held in such a position to hold the shutters in corresponding position. When the piston reaches the extreme end of its outward movement (Fig. 3), the shutters will be fully closed.

Under ordinary normal conditions, when the engine oil is free to flow through the cooler, there will be practically no pressure in the valve chamber 24 and the shutters remain open. If the temperature in the radiator drops, the pressure in the valve chamber 24 necessary to force the oil through the radiator will increase, due to the increase in viscosity of the oil, and the valve rod assembly will function in response to the increase in pressure for outward movement of the piston and corresponding closing movement of the shutters and restriction of cooling air flow through the radiator. Overtravel of the valve rod with respect to the piston, due to sudden pressure rises, is prevented by the shoulder 85 at the inner end of the valve chamber 86 which acts as a stop for the valve rod, as shown on Figure 3.

Figure 3 shows the valve rod assembly in its fully outer position with the piston 82 in its outer position for holding the shutters closed, on account of the oil in the radiator having become chilled or congealed. As the oil becomes warmed up again and the temperature increases with corresponding viscosity decrease, the pressure in the valve chamber 24 will correspondingly decrease so that the spring 98 may start moving the valve rod assembly 92 inwardly. The piston being held by the oil pressure in its outer position, the end of the valve rod will move outwardly in the valve chamber X until it exposes the annular port 86 at the inner end of the valve chamber, so that the oil behind the piston may escape through the passageways 87, the annular port 86, the valve chamber X, the ports 88 at the inner end of the valve chamber, and into the outer end of the cylinder chamber 66 and from there out through the passage 89 into the outlet space 70 so that the spring 91 may then shift the piston inwardly to follow the receding movement of the valve rod assembly 92. Should the valve rod stop its receding movement, the movement of the piston by the spring 91 will continue until the annular port 86 in the piston is closed by the end of the valve rod and further escape of oil from the inner end of the cylinder chamber 66 stops. The piston thus accurately follows the various movements of the valve rod and such movement of the valve rod and piston is in accordance with the pressure in the valve chamber 24, which pressure is dependent upon the resistance to flow through the radiator and consequently the temperature of the oil in the radiator. In other words, the pressure of the cooler oil dependent upon its temperature controls the operation of the shutters. The application of the varying fluid pressure to the piston is controlled by the valve rod assembly 92 which in turn is controlled by the varying pressure and the spring 98. The valve movement is accurately controlled by the pressure and the piston accurately follows the movement of the valve for corresponding control of the shutters.

I have shown a practical and efficient embodiment of the features of my invention but I do not desire to be limited to the exact construction, arrangement and operation shown and described, as changes and modifications may be made without departing from the scope of the invention.

I claim as my invention:

1. A controlling structure for an internal combustion engine oil cooler having shutters thereon, comprising a cylinder and a piston therein connected with the shutters for operation thereof, spring means tending to hold said piston at the inner end of said cylinder for opening of the shutters, a valve chamber in said piston and passageway therefrom into the cylinder behind the piston, an axially shiftable valve rod operable at its end in said piston valve chamber, said valve rod having a bore therethrough and a port for connecting the outer end of said bore with said piston passageway, spring means tending to hold said valve rod for displacement of its port from said passageway, means providing an inlet chamber for receiving the oil from the engine and said chamber having an outlet for delivery of the engine oil to the cooler, a valve in said inlet chamber for said outlet and a thermostat responsive to the temperature of the oil in said inlet chamber for controlling said valve, said valve rod being subjected to the pressure in said inlet chamber determined by the resistance to the flow from said chamber through the cooler, said pressure being the sole means and functioning independently of the temperature in said valve chamber for shifting said valve rod for connection of its port with said piston passageway for flow of oil under pressure from said chamber through the valve rod bore into the cylinder behind the piston for outward movement of the piston and closing movement of the shutters.

2. Controlling structure for the shutters on an internal combustion engine oil cooler comprising a cylinder and a piston therein connected with the shutters, a spring tending to move the piston to the inner end of the cylinder for opening of the shutters, a valve chamber in said piston, passageway through said piston from said valve chamber to the space behind the piston, a valve rod projecting at one end into said piston valve chamber, a bore through said valve rod and a port connecting said bore with said valve chamber, spring means normally holding said valve rod shifted outwardly in said valve chamber for displacement of its port from said piston passageway, said valve rod being subjected to the pressure of the oil flow from the engine to the cooler to be shifted solely by the oil pressure independently of and uninfluenced by the temperature of said flow for exposure of its port to the piston passageway and for flow of fluid through said bore and piston passageway into the cylinder behind the piston for outward movement of the piston for closing movement of the shutters, outward movement of said piston by the fluid pressure relative to said valve rod causing said piston to close said valve rod port until said valve rod again exposes said ports to the piston passageway, whereby said piston is restrained to follow the movement of said valve rod, and a valve for the flow from the engine to the cooler controlled by a thermostat responsive to the temperature of such flow.

3. A controlling structure for the shutters on an oil cooler comprising a housing on the cooler having an inlet space for receiving the oil to be cooled and having an outlet from said space to the cooler, a valve for said outlet and a thermostat responsive to the temperature of the oil in said inlet space to control said valve, a cylinder forming part of said housing and having a piston therein connected with the cooler shutters for operation thereof, spring means tending to move said piston to the inner end of said cylinder for opening of the shutters, the pressure in said inlet space being dependent upon the resistance to flow of the oil through the cooler, an axially movable valve element extending at its inner end into said inlet space to be subjected to the pressure therein for outward movement and having a bore therethrough for the flow of fluid from said inlet space, a spring resisting outward movement of said valve element, a valve chamber in said piston into which the outer end of said valve element extends, said piston having a port connecting said valve chamber with the cylinder space behind the piston, said valve element having a port at its outer end communicating with the bore therethrough, outward shift of said valve element by the fluid pressure in said inlet space aligning said valve element port with the piston port for flow of fluid from said inlet space into the cylinder space behind the piston for outward movement of the piston by the pressure until the piston port is moved out of alignment with the valve element port and continued outward movement of the valve element will again align said port for further outward movement of the piston, whereby the outward movement of said piston follows the outward movement of said valve element for closing movement of the shutters under control of the fluid pressure in said inlet space, the outer end of the cylinder having a discharge passageway for oil displaced by the outward movement of the piston, the movement of said valve element being controlled solely by the oil pressure in said inlet space and being uninfluenced by the oil temperature in said space.

4. A controlling structure for the shutters on an oil cooler comprising a housing on the cooler having an inlet space for receiving the oil to be cooled and having an outlet from said space to the cooler, a valve for said outlet and a thermostat responsive to the temperature of the oil in said inlet space to control said valve, a cylinder forming part of said housing and having a piston therein connected with the cooler shutters for operation thereof, spring means tending to move said piston to the inner end of said cylinder for opening of the shutters, the pressure in said inlet space being dependent upon the resistance to flow of the oil through the cooler, an axially movable valve element extending at its inner end into said inlet space to be subjected to the pressure therein for outward movement and having a bore therethrough for the flow of fluid from said inlet space, a spring resisting outward movement of said valve element, a valve chamber in said piston into which the outer end of said valve element extends, said piston having a port connecting said valve chamber with the cylinder space behind the piston, said valve element having a port at its outer end communicating with the bore therethrough, outward shift of said valve element by the fluid pressure in said inlet space aligning said valve element port with the piston port for flow of fluid from said inlet space into the cylinder space behind the piston for outward movement of the piston by the pressure until the piston port is moved out of alignment with the valve element port and continued outward movement of the valve element will again align said port for further outward movement of the piston, whereby the outward movement of said piston follows the outward movement of said valve element for closing movement of the shutters under control of the fluid pressure in said inlet space, the outer end of the cylinder having a discharge passageway for oil displaced by the outward movement of the piston, said piston structure having a second port controlled by said valve element and connecting said valve chamber with the outer end of the cylinder space, said valve element during outward movement thereof being interposed between said piston ports but upon inward movement thereof after an outward movement of the piston structure exposing both piston ports for fluid flow from the inner to the outer end of the cylinder space and inward movement of the piston structure by its spring means until inward movement of the piston relative to the valve element will cause said piston ports to be disconnected, whereby the inward movement of said piston structure for opening movement of the shutters follows the recessional movement of said valve element, the movement of said valve element being controlled solely by the oil pressure in said inlet space independently of and uninfluenced by the oil temperature in said space.

5. Control structure for the shutters on an oil cooler comprising a housing having an inlet space for receiving the oil to be cooled and having an outlet for flow of the oil to the cooler, a valve for said outlet and a thermostat responsive to the temperature of the oil in said inlet space to control said valve, the pressure in said inlet space being dependent upon the resistance of flow of the oil through the cooler, a cylinder forming part of said housing and having a piston structure therein connected with the shutters for operation thereof, spring means tending to move the piston structure to the inner end of said cylinder, said piston structure having a valve chamber therein, a port connecting the outer end of said valve chamber with the inner end of the cylinder behind the piston, a second port extending from the inner end of said valve chamber to the outer end of the cylinder in advance of the piston, the outer end of the cylinder having a discharge outlet for oil displaced by outward movement of the piston, an axially movable valve element projecting at its outer end into said valve chamber and projecting at its inner end into said inlet space to be subjected to the fluid pressure therein to be moved outwardly, spring means resisting the outward movement of said valve element, said valve element adjacent to its outer end having a port, a passageway through the valve element from said port to the inner end thereof for flow of fluid from said inlet space to said valve element port, said valve element port being closed by said piston structure when said valve element is at rest, outward movement of said valve element in said valve chamber bringing said valve element port into alignment with the piston structure port connected with the inner end of said cylinder whereby the fluid flow will shift said piston structure outwardly until outward movement thereof relative to the valve element will disconnect said ports until further outward movement of the valve element reconnects said ports for further outward movement of the piston structure, whereby said piston structure is restrained to follow the outward movement of said valve element controlled by the pressure in said inlet space, said valve element during outward movement thereof shutting off said piston structure ports from each other but during recessional movement thereof after a forward setting of the piston structure exposing said piston structure ports to each other for escape of the fluid from the inner end of the cylinder for inward movement of the piston structure by its spring means until inward movement of the piston structure relative to the valve element shuts off such flow, whereby inward movement of said piston structure must follow the recessional movement of said valve element by its spring means, the movement of said valve element being controlled solely by the oil pressure in said inlet space independently of and uninfluenced by the temperature in said space.

6. Controlling structure for an internal combustion engine oil cooler having shutters thereon, comprising a housing having an inlet chamber therein for receiving the oil from the engine, said inlet chamber having an outlet for flow of oil therefrom to the cooler, valve means in said inlet chamber, thermostat means responsive to the temperature in said inlet chamber for operating said valve means to control said outlet, the pressure in said inlet chamber being dependent upon the resistance to flow of the oil through the cooler, a cylinder forming part of said housing, a piston in said cylinder connected with the cooler shutters for operation thereof, spring means tending to move said piston inwardly for opening movement of the shutters, means providing a connection for flow of oil from said inlet chamber into the cylinder behind said piston for outward movement thereof and closing movement of the shutters, said piston having a valve chamber therein and ports connecting said valve chamber with the cylinder space at opposite sides of the piston, a control valve movable in said valve chamber and having a port included in said connection for cooperating with the piston ports, said control valve being subjected to the pressure in said inlet chamber to be controlled by the pressure in said inlet chamber for movement for cooperation of its port with the piston ports for control of the oil flow into said cylinder whereby to effect movement of said piston structure for control of said shutters in accordance with the pressure in said inlet chamber independently of the temperature in said inlet chamber.

7. Controlling valve structure for the radiator flow and warming jacket flow through the oil cooler for an internal combustion engine, comprising a housing having an inlet chamber for receiving the oil from the engine for delivery to the cooler and having an outlet chamber for receiving the oil from the cooler for return to the engine, a jacket outlet flow passageway to said outlet chamber, a radiator outlet flow passageway to said outlet chamber, a check valve in said jacket outflow passageway resisted by a comparatively strong spring and a check valve in said radiator outlet passageway resisted by a comparatively weak spring whereby at ordinary temperature substantially all of the oil flow through the cooler will be by way of the radiator and whereby, upon increased resistance to flow through the radiator to a predetermined degree, said jacket outlet passageway check valve will be opened for oil flow through the warming jacket, said inlet chamber having an outlet for flow of engine oil to the cooler and having another outlet for flow of engine oil to said outlet chamber, a valve assembly in said inlet chamber controlling said outlets, and thermostat means responsive to the temperature in said inlet chamber for controlling said valve assembly, said check valves being closed by excess pressure in said outlet chamber when said outlet to the cooler is closed and said outlet to the outlet chamber is open whereby to prevent harmful back pressure into the cooler from said outlet chamber.

8. Controlling structure for an internal combustion engine oil cooler having shutters thereon, comprising a housing having an inlet chamber therein for receiving the oil from the engine, said inlet chamber having an outlet for flow of oil therefrom to the cooler, valve means in said chamber, thermostat means responsive to the temperature of the oil in said chamber for operating said valve means to control said outlet, the pressure in said chamber being dependent upon the resistance to flow of the oil through the cooler, a cylinder forming part of said housing, a piston in said cylinder connected with the cooler shutters for operation thereof, spring means tending to move said piston inwardly for opening movement of said shutters, means providing a connection for flow of oil from said chamber into the cylinder behind said piston for outward movement thereof and closing movement of the shutters, and a valve controlled solely by the pressure in said chamber independently of and uninfluenced by the temperature in said chamber for controlling said oil connection to said cylinder to cause the movement of the piston to be dependent solely upon the oil pressure in said chamber.

HARRY L. CHISHOLM, Jr.